T. HEYERDAHL.
TELESCOPIC JOINT FOR HIGH PRESSURE WATER CONDUITS.
APPLICATION FILED SEPT. 30, 1919.
1,332,836.
Patented Mar. 2, 1920.
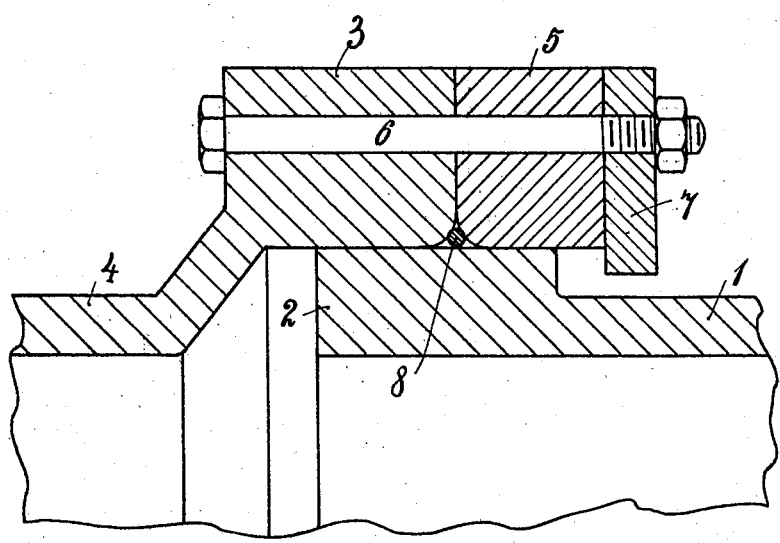
INVENTOR.
Thorvald Heyerdahl.
By
ATTORNEY.

UNITED STATES PATENT OFFICE.

THORVALD HEYERDAHL, OF CHRISTIANIA, NORWAY.

TELESCOPIC JOINT FOR HIGH-PRESSURE WATER-CONDUITS.

1,332,836. Specification of Letters Patent. Patented Mar. 2, 1920.

Application filed September 30, 1919. Serial No. 327,594.

*To all whom it may concern:*

Be it known that I, THORVALD HEYERDAHL, a subject of the King of Norway, residing at Christiania, Norway, have invented certain new and useful Improvements in Telescopic Joints for High-Pressure Water-Conduits; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object a telescopic joint for high pressure water conduits, and the object of the invention is to provide a joint or connection of this kind which will keep tight and at the same time allow for expansion of the tube ends even under the highest pressures.

It is known in telescopic joints of this kind to provide one tube end with an internally cylindrical extension inclosing the other tube end.

According to the present invention the interior and exterior tube ends are provided with annular flanges or ribs which act as braces for the telescope joint. In this manner the tube ends are caused to maintain their form even under the highest pressures whereby a tight connection is secured.

Further according to the invention the flange or annular rib on the edge of the enlarged tube member is provided with an extension forming an independent bracing element fastened to the end surface of the enlarged tube, while its inner edge is rounded off in order to form an annular channel which may be filled with a rubber packing or the like.

On the accompanying drawing is illustrated a radial section through a joint of the kind referred to.

One tube member 1 is provided with an external cylindrical flange 2 which fits into the enlarged cylindrical tube end 3 on the other tube 4.

An annular bracing element 5 forms an extension of the enlarged tube end 3 and is fastened to the latter by means of bolts 6. The bolts serve at the same time to hold ring segments 7 which extend inwardly from the ring 5 and act as stops in order to limit the movement of flange 2 with relation to the other tube member.

The inner adjacent edges of ring 5 and tube end 3 are rounded off as illustrated on the drawing, so that there is formed between the members 2, 3 and 5 an annular channel of approximately triangular cross section in which may be disposed a tightening ring 8 of rubber or the like. Said ring is pressed toward the right by the pressure of the water and thereby tightens the slot between parts 5 and 2.

I claim as my invention:

1. In a telescopic joint for high pressure water conduits, a pipe section having an enlarged cylindrical flange at one end, a pipe section having an external cylindrical flange which fits immediately and slidably in the first-named flange, and an annular element immediately encircling the second-named flange and arranged in abutting relation to the first-named flange and connected directly to the latter to form an extension thereof.

2. In a telescopic joint for high pressure water conduits, a pipe section having an enlarged cylindrical flange at one end, a pipe section having an external cylindrical flange which fits immediately and slidably in the first-named flange, an annular element immediately encircling the second-named flange and arranged in abutting relation to the first-named flange and connected directly to the latter to form an extension thereof, and an inwardly-projecting, annular stop element disposed against and coaxially with said annular extension element and connected to the same to limit the relative sliding movement of the flanges.

3. In a telescopic joint for high pressure water conduits, a pipe section having an enlarged cylindrical flange at one end, a pipe section having an external cylindrical flange which fits immediately and slidably in the first-named flange, an annular element immediately encircling the second-named flange and arranged in abutting relation to the first-named flange and connected directly to the latter to form an extension thereof, the adjacent inner edges of the first-named flange and the annular extension element being rounded so as to produce an annular space or channel between them, an annular packing element disposed in said channel, and means connected to said extension element to limit the relative sliding movement of the flanges.

In testimony that I claim the foregoing as my invention, I have signed my name in presence of two subscribing witnesses.

THORVALD HEYERDAHL.

Witnesses:
A. N. HEDENSCHAU,
A. B. COOK.